United States Patent [19]

Lavene

[11] 4,378,620

[45] Apr. 5, 1983

[54] METHOD OF MAKING SMALL SIZED WOUND CAPACITORS

[75] Inventor: Bernard Lavene, Ocean, N.J.

[73] Assignee: Electronic Concepts, Inc., Eatontown, N.J.

[21] Appl. No.: 330,867

[22] Filed: Dec. 15, 1981

Related U.S. Application Data

[63] Continuation of Ser. No. 108,593, Dec. 31, 1979, abandoned.

[51] Int. Cl.³ .............................................. H01G 4/18
[52] U.S. Cl. .................................... 29/25.42; 361/323
[58] Field of Search ............... 29/417, 25.42; 361/304, 361/323, 321, 324

[56] References Cited

U.S. PATENT DOCUMENTS

| | | | |
|---|---|---|---|
| 2,531,389 | 11/1950 | Brandt | 361/321 X |
| 2,727,297 | 12/1955 | Tralish | 361/304 X |
| 3,221,227 | 11/1965 | Devaney | 361/323 |
| 3,419,770 | 12/1968 | Tomago | 361/324 |
| 3,654,532 | 4/1972 | Rayburn | 361/323 |

*Primary Examiner*—Elliot A. Goldberg
*Attorney, Agent, or Firm*—Ratner & Prestia

[57] ABSTRACT

A method for fabricating substantially small sized capacitors in which capacitors are formed by winding a mated pair of dielectric webs having regularly spaced electrodes deposited thereon, into a tight coil. The electrodes are disposed so that in the finished product there is an electrode lying along one edge and an open space lying along the other edge in each layer of the wound coil, such arrangement alternating from lay to layer from the outermost to the innermost. The capacitor is finished by bonding a lead to the electrodes in each edge and potting the wound capacitor to withstand normal handling stresses.

2 Claims, 12 Drawing Figures

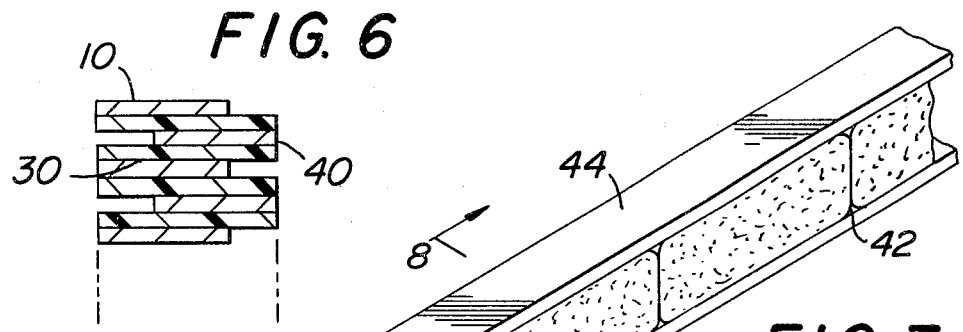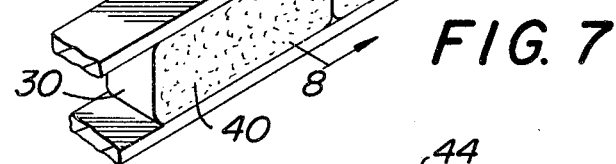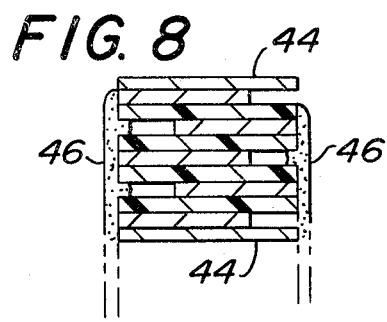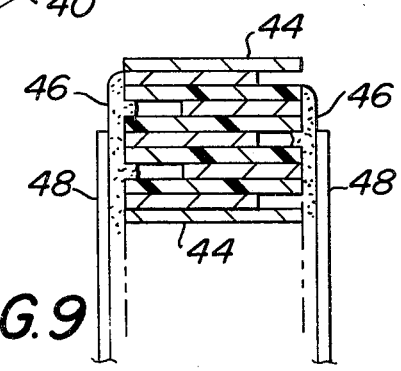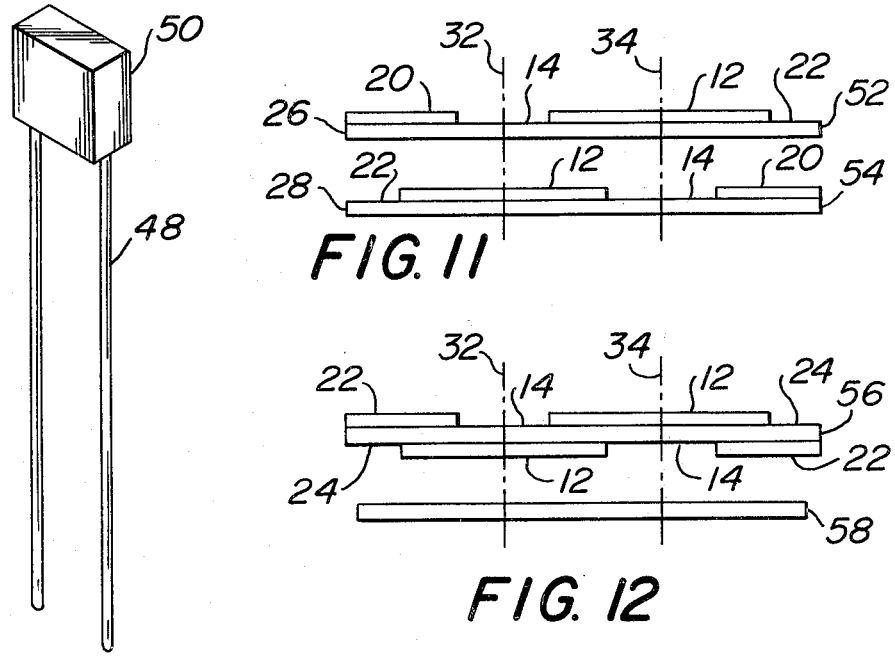

METHOD OF MAKING SMALL SIZED WOUND CAPACITORS

This application is a continuation of application Ser. No. 108,593, filed Dec. 31, 1979, now abandoned.

BACKGROUND OF THE INVENTION

1. Field of the Invention

This invention relates to methods of making volumetrically efficient wound capacitors, and more particularly, to methods of progressively forming an elongated member of interconnected capacitors and shearing successive capacitors therefrom.

2. Background Art

It is well known that small capacitors are very important in the electronic industry and that circuits have required smaller and smaller size capacitors for differing applications. It has also been recognized that when electrostatic capacitors are needed and small size is a requirement that only ceramic capacitors have been available in the small sizes. For example multilayered ceramic capacitors are on the order of $0.090 \times 0.190 \times 0.190$ in volume. However ceramic capacitors have had many disadvantages which have been recognized. For example, they have had problems with piezo-electric effects and silver migration. These losses resulting in capacitance losses in service are inversely proportional to the volumetric efficiency of the capacitor and proportional to the dielectric constant of the ceramic compound. Thus as the dielectric constant goes up the losses go up. Even with improved, more costly fabrication processes, these undesirable effects still have taken place.

It has been found that the foregoing undesirable characteristics are not found in film capacitors which have high insulation resistance, low dissipation factor, long term stability, self-healing capabilities and a failure mode which is an open not a short. However, film capacitors have heretofore not been commercially producible in the small sizes achievable with ceramic capacitors while still retaining the capacitive value and the voltage values of ceramic capacitors. The reason for this is that the metallized material that is conventionally being commercially wound is substantially wider than that which would be required for small size units. If a sufficiently narrow width film would be available, it has not yet been possible to wind it commercially to obtain such a narrow width. The prior art does show the cutting of film capacitors into variable portions but none of this was concerned with providing small volumetric size capacitors for maximum capacitance value.

Wound film capacitors are normally fabricated from strips or webs of a conductively coated dielectric formed into a tight coil. In winding the capacitor coil, two or more such webs are wound together with dielectric material between and around them so that the conductive material forms electrodes which are effectively insulated from each other. To start the formation of the coil, two conductive webs are mated so that one edge of the first electrode extends beyond the corresponding edge of the second, while the opposite edge of the second extends beyond the corresponding edge of the first. Thus, normally in winding the capacitor coil the two conductive webs are wound in a staggered arrangement with the intermediate dielectric material positioned between the electrodes. The wound capacitor coil thus has one extending edge of each electrode forming an end of the coil.

Wound capacitors fabricated from plastic or paper dielectric material and interleaved with metal foils acting as electrodes are in many respects satisfactory. However, such capacitors have certain disadvantages. The conductors or electrodes of one type of wound capacitor is a thin tin foil which is of low inherent mechanical strength, so that when the leads are soldered to the edges of the foil, care must be exercised using the capacitors to prevent tearing away of the leads. In an attempt to provide a more economical wound capacitor, aluminum foil has been used with resulting normal difficulty soldering lead wires to aluminum.

Another type of wound capacitor is that in which the conductive portions of the capacitor are formed from plastic tapes having a metalized coating on one side. Again a serious problem exists when wire leads are connected to the edges of the metallized plastic web in providing good electrical contact with the metallized coatings of the capacitor as well as in providing a sufficiently strong physical connection between the lead and the electrodes.

A review of the prior art shows that a number of attempts have been made to solve these problems. For example, Rayburn in U.S. Pat. No. 3,040,415 fabricates a capacitor from metal foil and plastic web; the foils being separated from each other by winding them between a wider dielectric plastic web so that the edges of the plastic web extend well beyond the edges of the metallic foils. Leads are attached to a capacitor wound in this manner by heating them to a sufficiently high temperature so that when one lead is placed against each end, the lead will melt through the extending edge of the plastic web, which in turn flows away and permits the heated lead to make contact with the edge of at least one of the metal foils. Upon cooling, the melted plastic fuses back into a solid portion locking the lead within the edge of the capacitor coil tightly against the edge of the metallic foil. When this is done it is found that there is usually sufficient metal foil material within the fused portion of the plastic material to provide an electrical contact between the lead and the conductive strips of the capacitor. However, this method of attaching the leads introduces problems of contamination into the lead conductor bond line resulting in a corresponding reduction in both the product uniformity and lifetime. Furthermore, in this construction the wire conductor does not make full electrical contact with all of the electrodes. Rather the output is a combination of both direct and inductive coupling with the result that the wound electrode may have a different potential depending on the nature of the coupling at a particular point. In addition, this type of construction is prohibitive for a metallized film construction since there would be insufficient metal within the fused portion of the plastic material necessary to yield electrical integrity.

In another approach, described by McGraw in U.S. Pat. No. 3,188,716, the webs are wound in the form of a hollow straw. The purpose of this design is for producing very small values of capacitance since only one single turn of wound material constitutes a final capacitor. Therefore, to produce an average film capacitor with this design having 100 wound turns or more of metallized film, it would require a machine having 100 individual rolls or more of metallized film-(with highly sophisticated metallized patterns not commercially available with present state of art)-making only one single turn around a mandrel. Another problem is that the capacitors are fairly large in size. Thus, they do not readily fit size requirements for capacitors which are to be employed as parts of printed circuit boards and other electronic devices where very small capacitors are needed.

SUMMARY OF THE INVENTION

A method for fabricating small capacitors for use on printed circuit boards and other electronic devices, the capacitors being formed from a mated pair of dielectric webs of indefinite length having a plurality of regularly spaced electrodes plated or deposited thereon. The electrodes are arranged so as to be parallel to the lengthwise direction of the webs and are separated from each other with a plurality of regularly spaced unplated openings. The arrangement on the first of these webs is that there is at least one electrode which lies along an edge of the dielectric web, and on the second web there is at least one unplated area lying along the corresponding edge. A series of capacitor elements are formed when the two webs are mated such that the plated edge of the first web lies directly over the unplated edge of the second web and then winding the pair of webs to form a tight coil. The arrangement of the remaining unplated and plated areas across the width of the webs is such that the centers of the plated areas of one web will fall more or less directly over the centers of the unplated areas on the other, so that when mated, the electrodes in the pair of webs are in a staggered and overlapping arrangement relative each other. Thus, when the coil is wound there are a series of parallel plate capacitor elements lying linearly across the width of the finished coil, the capacitance of each one being a function of both the width of the plated electrodes forming it and the number of turns used to wind the coil. The basic capacitor is finished by pressing the coil so that the electrodes and dielectric are tightly bonded together and each electrode is fully insulated from those around it. The individual capacitors are separated from each other by chopping the coil substantially through the centers of the open spaces in the two layers. With the staggered arrangement established by the mating operation this results in an arrangement such that for every layer there is an electrode at one chopped edge and an open space at the other; such arrangement alternating from one layer to the next.

The chopped edges of the coil are plated with metal to assure full electrical contact with each of the plated electrodes lying at one end or the other and bonding wire leads to the plating to form a finished capacitor. For commercial use, the finished capacitor is potted with a suitable plastic medium to protect the assembly and strengthen it for ease of handling. When this is done the finished product has a high volumetric efficiency, that is, there is more capacitance per equivalent volume of capacitor which is a prime requisite for capacitors intended for printed circuit applications.

For a more detailed disclosure of the invention and for other objects and advantages thereof, reference is to be had to the following description taken in conjunction with the accompanying drawings, in which like numbers refer to like parts.

BRIEF DESCRIPTION OF THE DRAWINGS

FIG. 6 is an isometric cross sectional view of an individual capacitor along line 6—6 of FIG. 5.

FIG. 7 is an isometric view showing the arrangement of the individual capacitors for metal plating.

FIG. 8 is an isometric view along line 8—8 of FIG. 7 showing the plating of the chopped edges.

FIG. 9 shows the formation of the finished capacitor by bonding lead wires to the plating.

FIG. 10 is a representation of the final potted capacitor ready for commercial use.

FIG. 11 is a cross sectional view of a second embodiment of the invention.

FIG. 12 is a cross sectional view of a third embodiment of this invention.

DETAILED DESCRIPTION OF THE PREFERRED EMBODIMENT

Figure 1:
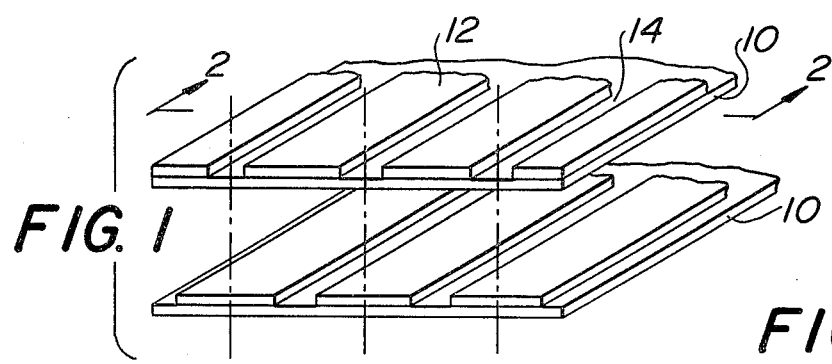
FIG. 1 is an exploded isometric view of two mated webs forming the basis of this invention.
Figure 2:
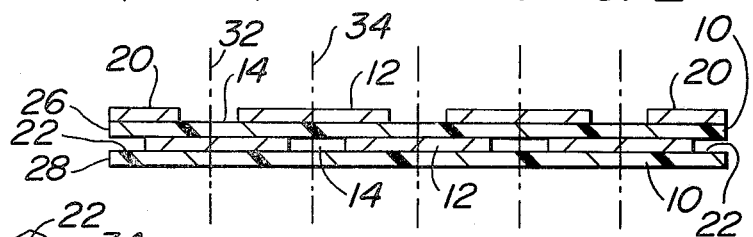
FIG. 2 is a cross section of the two webs along line 2—2 of FIG. 1.

Referring now to FIGS. 1 and 2 we see a representation of the basic embodiment of the present invention. As shown it comprises a mated pair of dielectric webs 10 of indefinite length. On each web there are a multiplicity of thin parallel metallic electrodes 12 deposited or plated onto one side thereof and running along the length of webs 10, said electrodes being separated by a set of parallel open spaces 14. The arrangement is such that the electrodes 12 are placed so that the outermost electrodes 20 lie along the edges of the first web and on the second there are open unplated areas 22 along corresponding edges. The overall shape of electrodes 12 is that of a set of elongated rectangles running parallel to the length of the web. These electrodes, with the exception of the ones lying along the edge, are essentially all of the same width as are the separating open spaces 14. As shown in FIGS. 1 and 2 the ratio of the widths of these elements is approximately 5:2 but other ratios, depending on the desired capacitance of the finished item can be used. The outer electrodes 20 are generally one-half the width of the remaining electrodes 12. Similarly, the outer open spaces 22 are one-half the width of the remaining spaces 14. The remaining electrodes 12 are arranged across the width of the two webs so that the electrode space pattern on one is in a staggered and overlapping arrangement relative to that in the other so that the central portion of a plated area on one of said webs is more or less over the center line of the open spaces directly above or below it.

Figure 3:
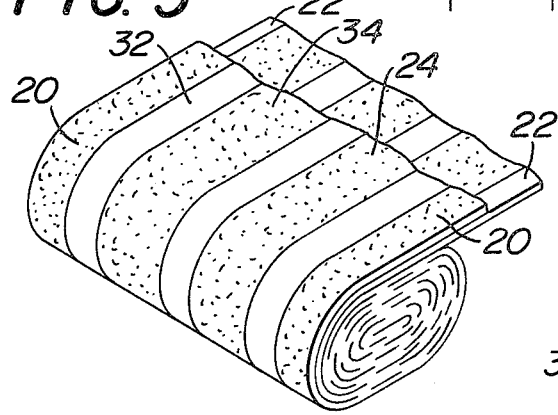
FIG. 3 is an isometric view showing the arrangement of the coil formed by winding the two webs together.

After the webs are mated together in the foregoing arrangement, they are tightly wound into a progressively larger layered concentric coil 24 having straight sides as shown in FIG. 3. When this is done there is an arrangement of concentric layers disposed so that on each side there is an alternating series of plated and unplated edges 26 and 28 from the outermost layer of coil 24 to the innermost. Furthermore, the remaining electrodes are disposed in a concentric pattern within the coil parallel to its sides.

Figure 5:
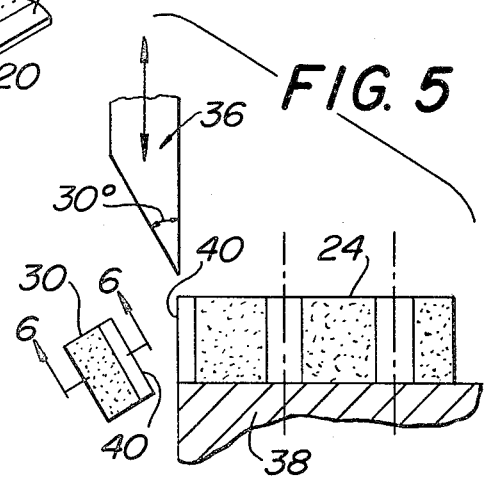
FIG. 5 shows formation of the individual capacitors by chopping along 5—5 of FIG. 4.
Figure 4:
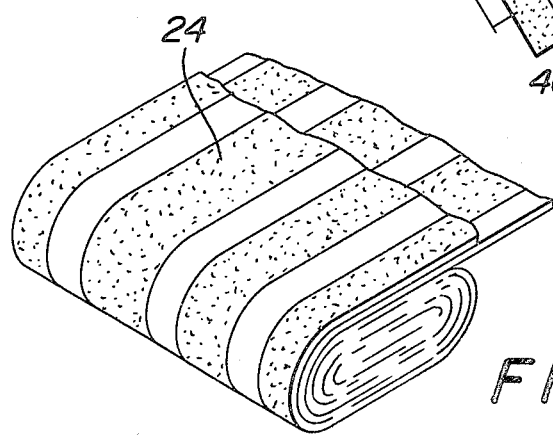
FIG. 4 is an isometric view of the coil of FIG. 3 after it has been flattened and tempered to form the basis of a finished capacitor.

To form the finished product the wound coil is first flattened as shown in FIG. 4, when heated to temper the dielectric. This results in the dielectric material in one layer bonding itself to the dielectric layer immediately next to it so that when cooling occurs each concentric conductive electrode is completely surrounded by a film of material which insulates it from the remaining conductors immediately surrounding it. The effect of this is that in the staggered arrangement formed by the coil there is a horizontal series of individual parallel plate capacitors 30 lying next to each other along the coil 24. These capacitors are separated from each other by chopping the finished coil vertically, alternately through the centers of the open unplated and plated areas 32 and 34 of the outermost layer of the coil, starting at one edge as shown in FIG. 5 and going progressively down the length of coil 24. To assure a clean cut, the chopping is done with a sharpened guillotine 36 working against an anvil 38 which supports the coil. This support prevents coil 24 from bending during chopping so that both interlaminar and translaminar cracking are avoided. Clean edges are assured by a 30° plate angle on the guillotine blade which has been found to be optimum for this purpose. At the completion of this operation there are a plurality of small capacitors each of which will have a series of concentric conductive elements lying on the even layers of one end and along the odd numbered layers of the other end. FIG. 6 is a cross sectional view of an individual capacitor 30.

To form the finished product the individual capacitors are lined up in such a manner that the chopped edges 40 face outward to form composite assembly 42 which can be plated with any metal material for bonding of lead wire. It should be noted that when this is done, the leads will make full electrical contact with each and every coated electrode appearing at the chopped edge to which it is attached. Thus, inductive coupling is completely avoided, the product is uniform and there are no open areas in the capacitor. Furthermore, by changing the relative widths of the plated and unplated web areas in the number of web turns to form coil 30 the capacitance of each unit can be tailored over a very wide range of values. The final product is formed by bonding wire leads 48 onto the plating of each end and potting it to form final assembly 50. The appearance of capacitor 30 at these intermediate stages is illustrated in FIGS. 7 to 10.

A number of different electrode space arrangements are available to make the basic configurations described herein. In the first of these, one edge (arbitrarily called the left edge) has one half width electrode 20 running along it followed by an alternating series of full width spaces 14 and electrodes 12 and terminating in a second half width electrode 20. This is shown in FIGS. 1 and 2. The second web in the mated pair starts with a half width space 22 and repeats the electrode/space pattern in the first web but terminating at the right edge with another half width space 22. The final capacitor is formed by mating the webs and processing them described hereinabove.

In yet another arrangement shown in FIG. 11 the first web 52 both starts with a half electrode 20 and terminates with a half width space 22. In effect this web as shown in FIG. 11 is one half of the first web described above. The other half is represented by the second web 54 which starts with a half width space 22 and ends with a half electrode 22. The advantage of this approach is that second web 54 is a mirror image of first web 52 and can be achieved by reversing end to end the first web. This simplifies the mating operation and the chances for accidentally miswinding the two webs are materially reduced.

Still another configuration is shown in FIG. 12. Here both sets of electrodes are deposited in the configuration shown on webs 52 and 54 in FIG. 11 on the two sides of the first web 56 of the pair while the second web 58 is merely a blank sheet of dielectric. Note that in this configuration uncoated web 58 is slightly narrower than first web 56 so that in winding there is no problem in assuring that each edge electrode comes fully out to its respective end.

Depending on the facilities available any of these methods may be used. No difference has been shown in the properties of the finished products produced by them.

The materials for these capacitors are not especially critical. Thus the dielectric webs may be made of a wide variety of thermoplastic film materials. Of these, polyester film, such as Mylar, has been found to possess a highly favorable mix of dielectric and physical properties combined with a reasonable tempering temperature. Polycarbonate, polysulfone and polypropylene films may also be used. Similarly, the electrode material is not especially critical so long as it will bond well to the edge plating material.

The principles and objects of the invention having now been explained, it is to be understood that many modifications may be made within the spirit and scope of the following claims.

What is claimed is:

1. A method of fabricating substantially small sized wound capacitors comprising plating a plurality of continuous regularly spaced metallic electrodes on one side of each of a pair of dielectric plastic webs, said electrodes being parallel to the web and further the electrodes being separated from each other forming a plurality of regularly spaced unplated lengthwise directed openings;
    (a) arranging the electrodes so that in each pair of webs at least one has an electrode lying along one edge and the other has an open area lying along one edge;
    (b) mating said pair of webs so that the unplated side of a first of the webs is in physical contact with the plated side of the second web and further arranged so that the plated edge of one web lies over the unplated edge of the other so that the remainder of the electrodes in each web are in a staggered and overlapping arrangement relative to each other such that substantially the same portion of the remaining electrodes on said pair of webs will fall over the remaining open spaces in said webs;
    (c) winding a length of said mated webs to form a cylindrical layered coil to form an alternating arrangement of continuous electrodes spaced from layer to layer along the outer edges of said coil as it is wound;
    (d) flattening said cylindrical layered coil to form a substantially rectangular layered coil;
    (e) tempering the plastic in said webs so that the electrodes and plastic are fixed together with each electrode being fully insulated from those around it without the addition of any separate adhesive;
    (f) chopping the coil to provide a clear cut through the alternating open spaces and electrodes in the webs such that at the chopped edges for every layer there is an arrangement in which an electrode is at one edge and an open space at the other, alternating from one layer to the next, the coil being chopped only once to form an individual capacitor of wound continuous electrodes with no further chopping or tempering of said capacitors; and (g) bonding conductors to the chopped edges of said capacitors, said conductors making electrical contact with each of the plated electrodes lying at the edge to form a finished capacitor steps c, d, e, f, and g being performed in sequence.

2. The method of claim 1 in which said dielectric webs are formed of polycarbonate.

* * * * *